United States Patent
Tanaka

(10) Patent No.: US 10,569,710 B2
(45) Date of Patent: Feb. 25, 2020

(54) ATTENTION CALLING SYSTEM AND VEHICLE SEAT CONTROLLING SYSTEM

(71) Applicant: TOYOTA BOSHOKU KABUSHIKI KAISHA, Aichi-ken (JP)

(72) Inventor: Yasuhisa Tanaka, Aichi-ken (JP)

(73) Assignee: TOYOTA BOSHOKU KABUSHIKI KAISHA, Aichi-Ken (JP)

(*) Notice: Subject to any disclaimer, the term of this patent is extended or adjusted under 35 U.S.C. 154(b) by 315 days.

(21) Appl. No.: 15/422,704

(22) Filed: Feb. 2, 2017

(65) Prior Publication Data
US 2017/0225618 A1 Aug. 10, 2017

(30) Foreign Application Priority Data
Feb. 10, 2016 (JP) .................. 2016-024116

(51) Int. Cl.
*B60Q 9/00* (2006.01)
*B60N 2/90* (2018.01)

(52) U.S. Cl.
CPC .............. *B60Q 9/008* (2013.01); *B60N 2/90* (2018.02); *B60N 2002/981* (2018.02); *B60Q 9/00* (2013.01)

(58) Field of Classification Search
USPC ........................................................ 701/49
See application file for complete search history.

(56) References Cited

U.S. PATENT DOCUMENTS

| 2002/0140562 A1* | 10/2002 | Gutta ............... G08B 21/06 340/576 |
| 2008/0023951 A1* | 1/2008 | Al-Samarae ......... B60N 2/0232 280/748 |
| 2012/0226418 A1 | 9/2012 | Veen et al. |

FOREIGN PATENT DOCUMENTS

| JP | 2000-020900 | 1/2000 |
| JP | 2008-260444 | 10/2008 |
| JP | 2010-029459 | 2/2010 |
| JP | 2014-239360 | 12/2014 |

OTHER PUBLICATIONS

Japanese Office Action dated Jun. 4, 2019 in Japanese Application No. 2016-024116, and corresponding English translation thereof.

* cited by examiner

*Primary Examiner* — James M McPherson
(74) *Attorney, Agent, or Firm* — Greenblum & Bernstein, P.L.C.

(57) ABSTRACT

An attention calling system for a vehicle seat having one or more drive devices incorporated therein, the attention calling system including: a vehicle information acquisition unit that is configured to acquire vehicle information; and a control unit that is configured to determine based on the vehicle information whether it is an attention state in which seated person's attention should be called and controls at least one of the drive devices when it is determined that it is the attention state, wherein the control unit is configured to control the at least one drive device so that the seat or the predetermined part of the seat reciprocally moves in both positive and negative directions with reference to a current position at a speed higher than a predetermined speed, in correspondence to the attention state.

7 Claims, 7 Drawing Sheets

ATTENTION CALLING SYSTEM AND VEHICLE SEAT CONTROLLING SYSTEM

CROSS-REFERENCE TO RELATED APPLICATIONS

This application claims priority from Japanese Patent Application No. 2016-024116 filed on Feb. 10, 2016, the entire contents of which are incorporated herein by reference.

TECHNICAL FIELD

The disclosure relates to an attention calling system and a vehicle seat controlling system that call seated person's attention based on vehicle information by using a drive device of an electric seat.

BACKGROUND

An automobile is equipped with a system that detects a state destructive to safety by processing information obtained using a variety of sensors such as a camera, a radar and the like, to assist driving and to issue an alert to a driver. For example, a collision avoidance support system configured to detect a possibility of collision, to issue an alert to a driver by a sound and the like and to operate an automatic brake has been known. Also, a variety of safety systems such as a lane deviation detection system configured to support maintenance or change of a traveling lane of an own vehicle, an object detection system configured to detect a person and an obstacle on a road, a drowsiness detection system configured to detect drowsiness or side-glance of a driver and to issue an alert to the driver and the like have been used. In most of the safety systems, the driver's attention is called by an indicator, a sound, an image or the like. Also, a system configured to call driver's attention by vibrating a seat on which the driver is seated has been considered (for example, refer to JP-A-2010-029459). A driver's attention recovering device disclosed in JP-A-2010-029459 is configured to detect a driver's attention-lowered state from traveling information such as a steering angle of a steering wheel, and to slide a seat in a left-right direction of a vehicle or to rotate the same in the left-right direction by using an attention recovering drive unit provided in the seat, thereby recovering the driver's attention.

As described above, when a variety of states destructive to the safety of the vehicle driving are detected, for example, when a possibility of collision or lane deviation occurs to the own vehicle or when the drowsiness or side-glance of the driver is detected, the driver's attention is called depending on contents or degree of importance thereof. In the diverse safety systems equipped at the automobile, a variety of attention calling units such as warning sound, voice, indicator, image and the like are used so as to call driver's attention. When a physical sense is provided for the driver by a unit configured to directly stimulate a driver's body together with or instead of an attention calling unit configured to stimulate the driver's senses of sight and hearing, it is possible to call driver's attention more securely. For example, like the driver's attention recovering device disclosed in JP-A-2010-029459, when the seat is provided with the attention calling drive device and the seat is vibrated upon detection of a predetermined state, for example, it is possible to call driver's attention. However, if the seat is provided with the drive device for generating the vibration or the like, it is not only necessary to secure an installation space for the corresponding component but also the cost increases. Also, it is needed to easily and effectively provide the physical feeing for the passenger in accordance with the diverse states detected by the safety systems.

SUMMARY

The disclosure provides an attention calling system and a vehicle seat controlling system, which are configured to call seated person's attention based on vehicle information by using a drive device of an electric seat.

According to an aspect of the disclosure, there is provided an attention calling system for a vehicle seat having one or more drive devices incorporated therein, a position of the seat or a position of a predetermined part of the seat being capable of being adjusted by moving the seat or the predetermined part of the seat in both positive and negative directions at a predetermined speed by the drive device, the attention calling system including: a vehicle information acquisition unit that is configured to acquire vehicle information; and a control unit that is configured to determine based on the vehicle information whether it is an attention state in which seated person's attention should be called and controls at least one of the drive devices when it is determined that it is the attention state, wherein the control unit is configured to control the at least one drive device so that the seat or the predetermined part of the seat reciprocally moves in both positive and negative directions with reference to a current position at a speed higher than the predetermined speed, in correspondence to the attention state.

According to another aspect of the disclosure, there is provided a vehicle seat controlling system including: a vehicle seat for a vehicle; a drive device incorporated inside the vehicle seat; and an electronic control unit configured to perform: controlling the drive device so that the seat or a predetermined part of the seat moves in both positive and negative directions at a predetermined speed, thereby adjusting a position of the seat or a position of the predetermined part of the seat in a case where the vehicle is in a usual state, acquiring vehicle information, determining whether the vehicle information indicates an attention state in which seated person's attention should be called, and controlling the drive device so that the seat or the predetermined part of the seat reciprocally moves in both positive and negative directions with reference to a current position at a speed higher than the predetermined speed, in response to determining that the vehicle information indicates in the attention state.

DETAILED DESCRIPTION

The following descriptions exemplarily explain an illustrative embodiment of the disclosure, and provide explanations by which the principle and conceptual features of the disclosure can be understood most effectively and easily. The descriptions are not intended to indicate the structural details of the disclosure beyond the necessity for fundamental understandings of the disclosure and are to enable one skilled in the art to clearly understand how some embodiments of the disclosure are to be actually implemented with reference to the drawings.

Figure 1:
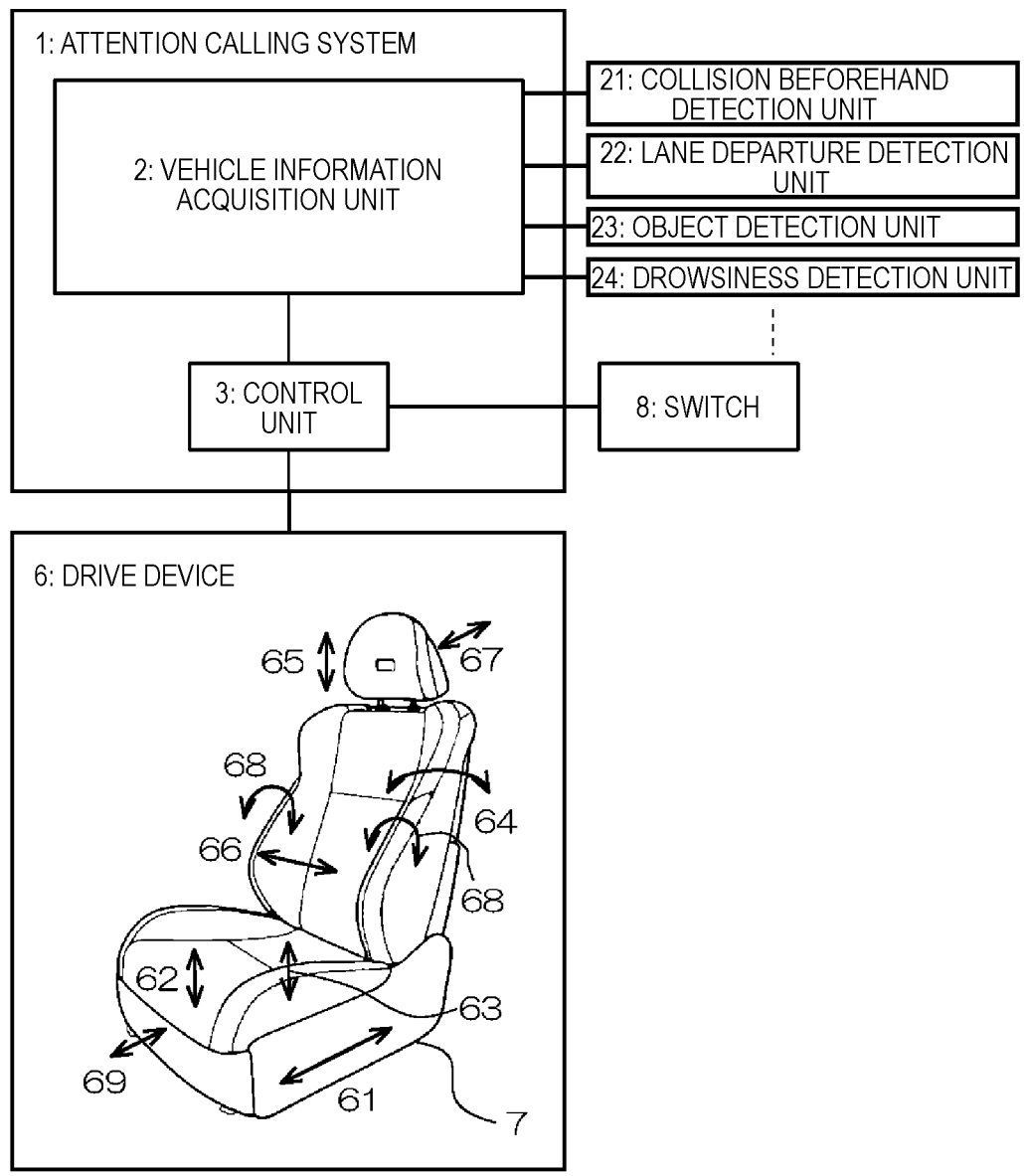
FIG. 1 is a block diagram depicting a configuration of an attention calling system according to an illustrative embodiment of the disclosure.

As shown in FIG. 1, an attention calling system 1 of the illustrative embodiment is provided for a vehicle seat 7 having one or more drive devices 6 (61 to 69) incorporated therein, and includes a vehicle information acquisition unit 2 that is configured to acquire vehicle information and a control unit 3 that is configured to determine based the vehicle information whether it is an attention state in which seated person's attention should be called and controls at least one of the drive devices 6 when it is determined that it is the attention state.

The vehicle seat 7 to which the attention calling system 1 is applied is a seat of which a position, a posture and the like can be changed by the drive devices 6 embedded in the seat, such as a general electric seat. The vehicle seat 7 may be a front seat such as a driver seat and an assistant seat, and may also be a second seat or a third seat.

A type of the drive device 6 is not particularly limited inasmuch as it can operate in both positive and negative directions. However, in most cases, a motor is used. Also, the number, installation positions and the like of the drive devices 6 are not particularly limited. FIG. 1 exemplifies a drive device 61 for slide configured to move the entire vehicle seat 7 in a front-rear direction, a drive device 62 for front vertical configured to change an inclination of a seat cushion by moving a front part of the seat cushion in an upper-lower direction, a drive device 63 for rear vertical (lifter) configured to change an inclination of the seat cushion by moving a rear part of the seat cushion in the upper-lower direction, a drive device 64 for reclining configured to change an inclination of a seatback, a drive device 65 for headrest configured to move a headrest in the upper-lower direction, a drive device 66 for lumbar configured to expand and contract the seatback in the front-rear direction, a drive device 67 for pre-crash headrest configured to move the headrest in the front-rear direction so as to reduce a collision damage, a drive device 68 for side support configured to expand and contract or move right and left support parts of the seat cushion, and a drive device 69 for cushion length configured to expand and contract or move the seat cushion in the front-rear direction. However, the disclosure is not limited thereto. That is, the vehicle seat 7 may be provided only with the drive device 61 for slide or may be provided with the drive device 61 for slide and the drive device 64 for reclining, for example.

By the drive devices 6 provided as described above, it is possible to change (move) a position of the vehicle seat 7 and a position of a predetermined part of the vehicle seat 7 (hereinafter, referred to as "each part of the vehicle seat"). Each of the drive devices 6 is configured to operate in both positive and negative directions such as forward rotation and reverse rotation. A movement aspect of each part of the vehicle seat 7 by each drive device 6 is not particularly limited, and includes tilting, rotation and the like, in addition to linear movements in front, rear, upper and lower directions. Usually, the drive devices 6 are controlled by a seated person's operation on a switch 8 and are also controlled to be at predetermined set positions, so that each part of the vehicle seat 7 can move at a predetermined speed (a substantially constant slow speed) in the positive or negative direction.

The vehicle information acquisition unit 2 is a unit configured to acquire, as vehicle information, signals of sensors provided for a vehicle and alerts generated by a variety of safety units provided for the vehicle. The vehicle information is not particularly limited. For example, not only a signal of an ignition switch and information indicative of traveling situations of a vehicle such as vehicle speed and steering angle but also information to be generated by a variety of external safety units can be exemplified. Many safety units of a vehicle are implemented using a camera, a millimeter wave radar, a laser radar and the like. For example, a collision beforehand detection unit 21 configured to recognize a front or rear oncoming vehicle and to beforehand detect a collision possibility of a vehicle, a lane departure detection unit 22 configured to recognize a lane during the traveling and to detect an unintentional deviation from the lane, an object detection unit 23 configured to detect an object, a human body and the like, and the like may be exemplified. Further, a detection unit configured to detect a road sign, a signal and the like and a safety unit configured to use a road-to-vehicle or vehicle-to-vehicle wireless communication can be exemplified. Also, a drowsiness detection unit 24 configured to detect drowsiness of a driver can be exemplified. When the vehicle is provided with the above safety units, the vehicle information acquisition unit 2 can acquire the detection information, alerts and the like to be output from the safety units, as the vehicle information.

The control unit 3 is configured to determine based on the vehicle information acquired by the vehicle information acquisition unit 2 whether it is an attention state in which seated person's attention should be called, and controls at least one of the drive devices 6 when it is determined that it is the attention state. The attention state in which seated person's attention should be called includes a state where a vehicle should be stopped such as a case where there is a possibility of collision, a state where a vehicle direction should be changed such as deviation of a lane or avoidance of an obstacle, a state where surrounding information is to be notified for recognition of a sign, and the like. A condition for determining the attention state may be set in advance depending on types, contents, degree of importance and the like of the vehicle information. Also, when the plurality of drive devices 6 is provided, an operation condition as to which drive device 6 is to be controlled (i.e., which part of the respective parts of the vehicle seat 7 is to be driven) in accordance with each attention state may be set in advance in correspondence to the vehicle information. The control unit 3 may also be configured to control the plurality of drive devices 6 in association with one vehicle information.

The control unit 3 is configured to control the drive devices 6 so that each part of the vehicle seat 7 reciprocally moves at a speed higher than a predetermined speed in positive and negative directions with reference to a current position, in correspondence to the attention state. The predetermined speed is a speed at which, usually, each part of the vehicle seat 7 is moved so as to adjust the vehicle seat to a position and a posture favorable to the seated person. The predetermined speed is appropriately set. Since the drive devices are controlled so that each part of the vehicle seat 7 is reciprocally moved at the speed higher than the predetermined speed, each part of the vehicle seat 7 is vibrated. Parts and directions in which the vibrations are to be generated are preferably set so that the seated person can easily intuitively know what the attention state is. For example, when the attention state is an attention as to an inter-vehicle distance, the seat is vibrated in the front-rear direction, and when the attention state is an attention as to a lane deviation, the seat is vibrated in the left-right direction.

For example, when the collision beforehand detection unit 21 is connected, the control unit 3 determines that it is the attention state if an alert (collision beforehand detection information) is acquired from the collision beforehand detection unit 21, and controls at least the drive device 61 for slide configured to move the vehicle seat 7 in the front-rear direction. That is, when the alert of collision beforehand detection is received, it means the most dangerous state. Therefore, it is necessary to issue a strong warning to the seated person by largely vibrating the vehicle seat 7 in the front-rear direction.

The control unit 3 may be configured to perform the control by applying drive signals to the respective drive devices 6. For example, when the drive device 6 is a motor, a moving direction can be controlled by an electrical polarity of the drive signal, a moving speed can be controlled by a voltage or the like of the drive signal, and a moving amount can be controlled by a time period during which the drive signal is to be applied. The drive signal that is to be applied to the drive device 6 by the control unit 3 is preferably set to have a magnitude and a period by which vibration, which can be sensed by the seated person, is to be generated at each part of the vehicle seat 7. The moving speed and the moving amount can be appropriately set depending on a structure, a material and the like around the part in which the drive device 6 is provided. Also, a period (frequency) of the reciprocal movement is not particularly limited but is preferably set to a period at which a person usually feels a strong sense of discomfort (for example, about 5 to 10 Hz). Also, while each part of the vehicle seat 7 is vibrated, the magnitude (amplitude) and period of the drive signal may be constant or may be changed. For example, the amplitude may be increased or the period may be shortened over time so that the seated person's attention is to be further called.

Also, the control unit 3 may be controlled to apply the drive signal to each drive device 6 so that a moving amount in the positive direction and a moving amount in the negative direction are the same with reference to the current position. By such drive signal, a central position of each part of the vehicle seat 7 is not changed during the vibration and is kept at the same position as the original position even when the vibration is over. Here, it is not necessarily required that the moving amount in the positive direction and the moving amount in the negative direction for one period be the same. For example, the moving amounts may be distributed so that the position of each part of the vehicle seat 7 does not change between the start and the end of the vibration.

The attention calling system 1 configured as described above can be applied to the existing vehicle seat 7 in which the drive devices 6 are incorporated. The vehicle information acquisition unit 2 and the control unit 3 can be incorporated into an existing Electronic Control Unit (ECU) configured to adjust a position of the vehicle seat 7. Therefore, the attention calling system 1 can be implemented using the existing vehicle electric seat without using a new component or device.

Figure 8:
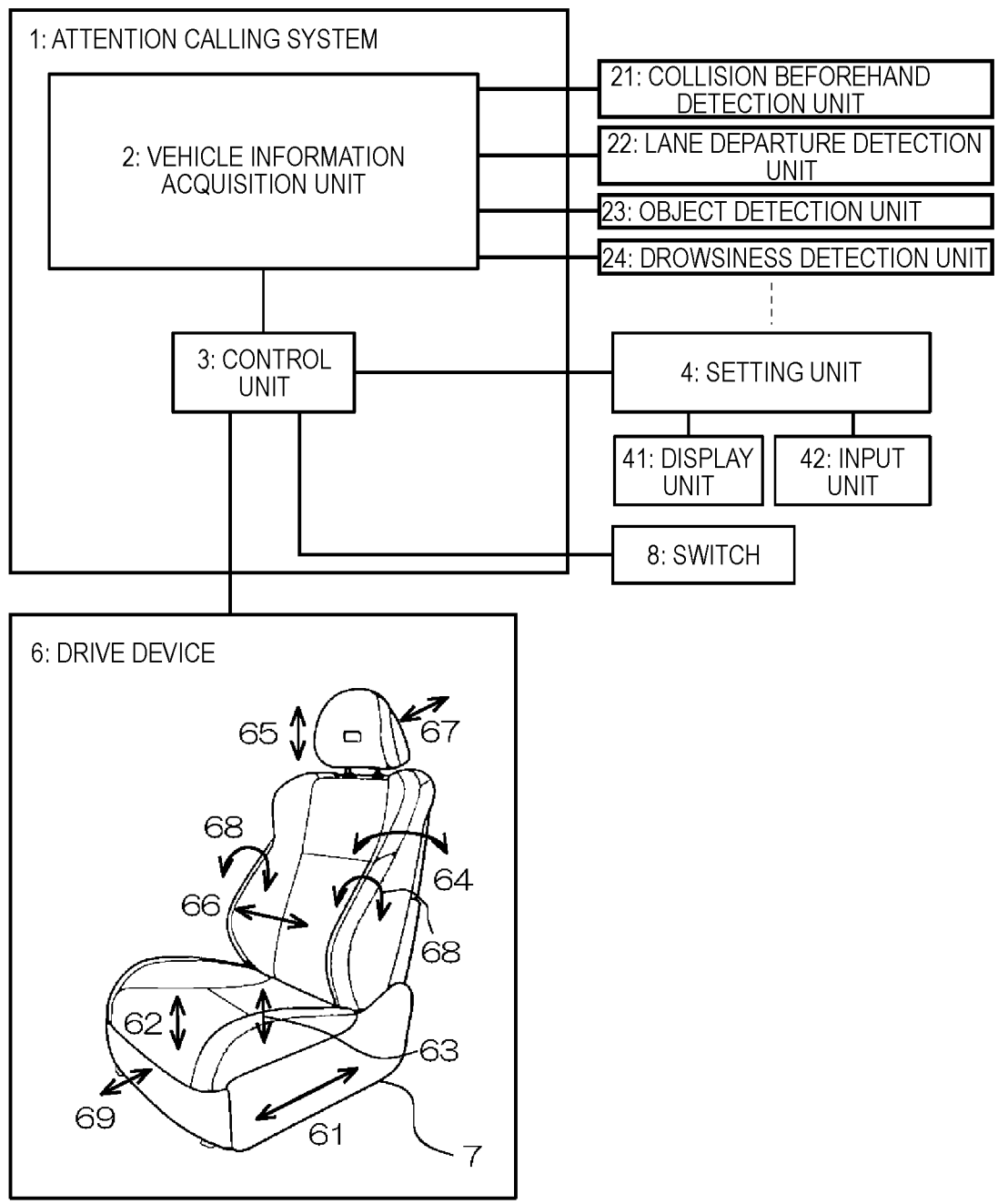
FIG. 8 is a block diagram depicting a configuration of the attention calling system having a setting unit.

In addition, the attention calling system 1 may have a setting unit 4 configured to change the drive device 6 to be controlled by the control unit 3 in correspondence to the contents of the vehicle information (refer to FIG. 8).

Hereinafter, the disclosure will be described in more detail with reference to an illustrative example.

A configuration of an attention calling system according to the illustrative example is the same as the attention calling system 1 shown in FIG. 1, and has the vehicle information acquisition unit 2, the control unit 3, and the drive devices (motors) 61 to 69 incorporated into the vehicle seat 7. Functions of the attention calling system 1 (the vehicle information acquisition unit 2 and the control unit 3) are stored as a program of an ECU for controlling the vehicle seat 7.

The vehicle seat 7, which is to be driven by the attention calling system 1 of the illustrative example, has at least a motor 61 for slide configured to move the entire vehicle seat 7 in the front-rear direction, a motor 62 for front vertical and a motor 63 for rear vertical configured to move a seat surface in the upper-lower direction, a motor 65 for headrest configured to move a headrest in the upper-lower direction, and a motor 68 for side support configured to expand and contract or move right and left support parts of the seat cushion, as the motors 6. The motors 6 can be usually controlled by operating a switch 8 for seat position adjustment provided around the vehicle seat 7.

The vehicle information acquisition unit 2 is connected to the collision beforehand detection unit 21, the lane departure detection unit 22, the object detection unit 23 and the drowsiness detection unit 24, which are provided in the vehicle, and is configured to acquire the vehicle information from the units. The control unit 3 monitors the vehicle information acquired by the vehicle information acquisition unit 2 and to determine whether it is an attention state in which the seated person's attention should be called, and controls at least one motor 6 when it is determined that it is the attention state. When the respective detection information (alert) is received from the collision beforehand detection unit 21, the lane departure detection unit 22, the object detection unit 23 and/or the drowsiness detection unit 24, the control unit 3 determines that an important attention state has occurred, and outputs the drive signal to one or more of the motors 6, thereby vibrating each part of the vehicle seat 7. A time period for which the vibration is to be generated is arbitrarily set. For example, the time period may be set to a constant continuous or intermittent time period or may be set to a time period until the attention state to be called is over.

Figure 2:
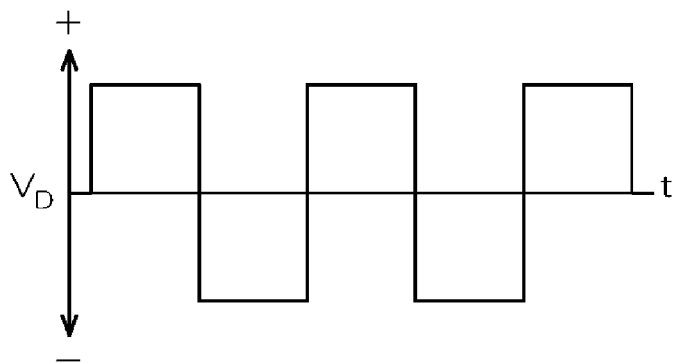
FIG. 2 is a timing chart depicting an example of a drive signal that is to be output to a drive device by a control unit of the attention calling system.
Figure 3:
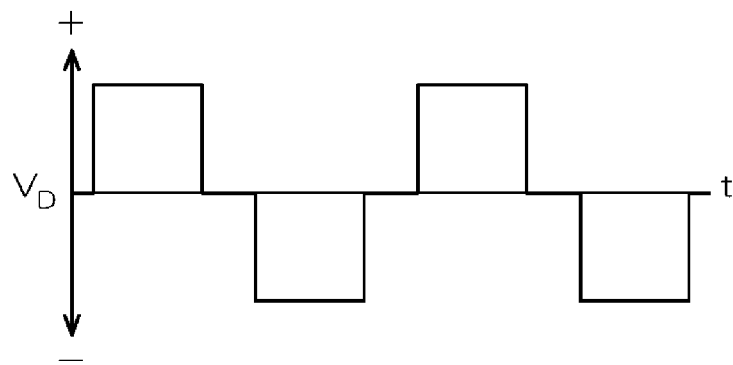
FIG. 3 is a timing chart depicting another example of the drive signal that is to be output to the drive device by the control unit of the attention calling system.

FIGS. 2 and 3 depict examples of the drive signal that is to be output to the motor 6, which is a control target of the control unit 3. A control method of the motor 6 is not particularly limited. For example, rotation of the motor may be controlled by pulse width modulation (PWM). In FIGS. 2 and 3, a vertical axis indicates a driving voltage $V_D$ that is to be applied to the motor 6. A magnitude of the driving voltage $V_D$ can be controlled by a duty ratio of the PWM. The control unit 3 can set the duty ratio for vibrating the vehicle seat 7 to a ratio different from a usual case where the switch 8 is operated to move the vehicle seat 7 for position adjustment, and can move the vehicle seat 7 at a speed higher than usually. Also, the control unit may be configured to perform voltage control, which does not depend on the PWM, and to set the driving voltage $V_D$ for vibrating the vehicle seat 7 to a voltage higher than usually.

Also, the polarity of the drive signal is switched so that it becomes positive (+) and negative (−) directions at regular intervals. Thereby, the motor 6 repeatedly rotates in forward and reverse directions at a speed corresponding to the driving voltage $V_D$, thereby vibrating the corresponding part of the vehicle seat 7. A frequency of the drive signal, i.e., a vibration frequency may be about 5 to 10 Hz, preferably about 7 Hz. In the illustrative embodiment, the forward and reverse rotations are performed at the same speed and the time periods of the forward and reverse rotations are the same. Therefore, the corresponding part of the vehicle seat 7 reciprocally moves so that the moving amount in the positive direction and the moving amount in the negative direction are the same with reference to the current position. Also, as shown in FIG. 3, a drive signal in which a stop time period is provided between the forward and reverse rotations may be used. In the meantime, a waveform of the drive signal is not particularly limited inasmuch as it vibrates the vehicle seat 7. For example, a rectangular wave, a triangular wave, a saw-tooth wave, a sinusoidal wave or the like may be appropriately selected.

Figure 4:
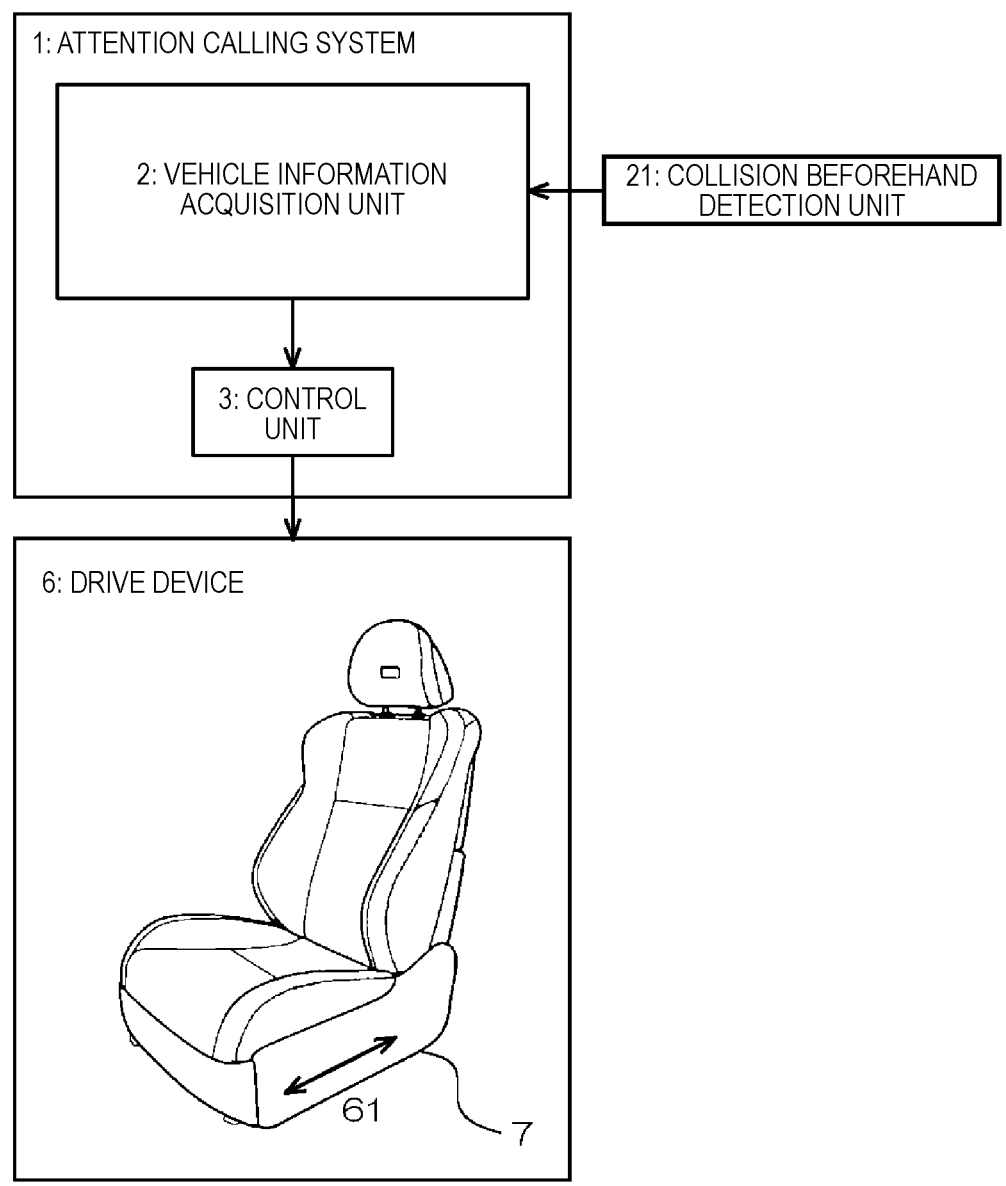
FIG. 4 is a block diagram for illustrating an operation of the attention calling system, which is performed when collision beforehand detection information is received.

A control that is to be performed when the collision beforehand detection unit 21 is connected to the attention calling system 1 is described with reference to FIG. 4. When a possibility of vehicle collision occurs, the collision beforehand detection unit 21 issues the collision beforehand detection information (alert) and assists the driving by operating a brake so as to reduce a damage. The alert is received by the vehicle information acquisition unit 2. Based on the alert, the control unit 3 outputs the drive signal to the motor 61 for slide. Thereby, the entire vehicle seat 7 is reciprocally moved (vibrated) in the front-rear direction, so that it is possible to strongly call seated person's attention.

Figure 5:
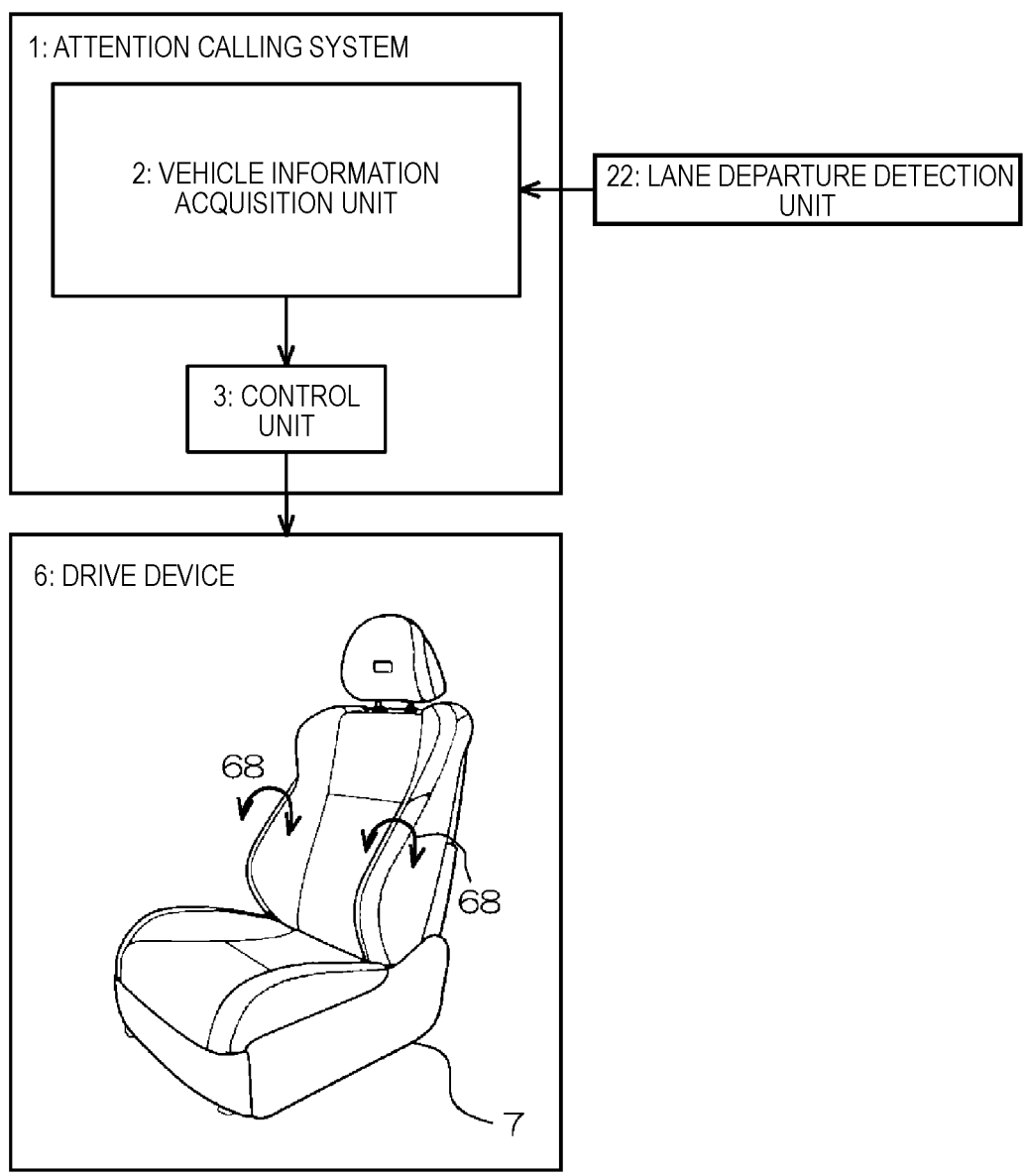
FIG. 5 is a block diagram for illustrating an operation of the attention calling system, which is performed when lane deviation detection information is received.

FIG. 5 depicts that the lane departure detection unit 22 is connected to the attention calling system 1. The lane departure detection unit 22 is configured to recognize a front lane. When the lane deviation such as crossover of the lanes is detected, the lane departure detection unit calls attention to the driver or assists a steering operation for return to the original lane by a warning sound, an image or the like, thereby assisting the driving. At this time, the lane deviation detection information output from the lane departure detection unit 22 is received by the vehicle information acquisition unit 2. Based on the received information, the control unit 3 outputs the drive signal to the motor 68 for side support. Thereby, the side support parts of the vehicle seat 7 are vibrated in the left-right direction, so that the seated person's attention can be called.

Figure 6:
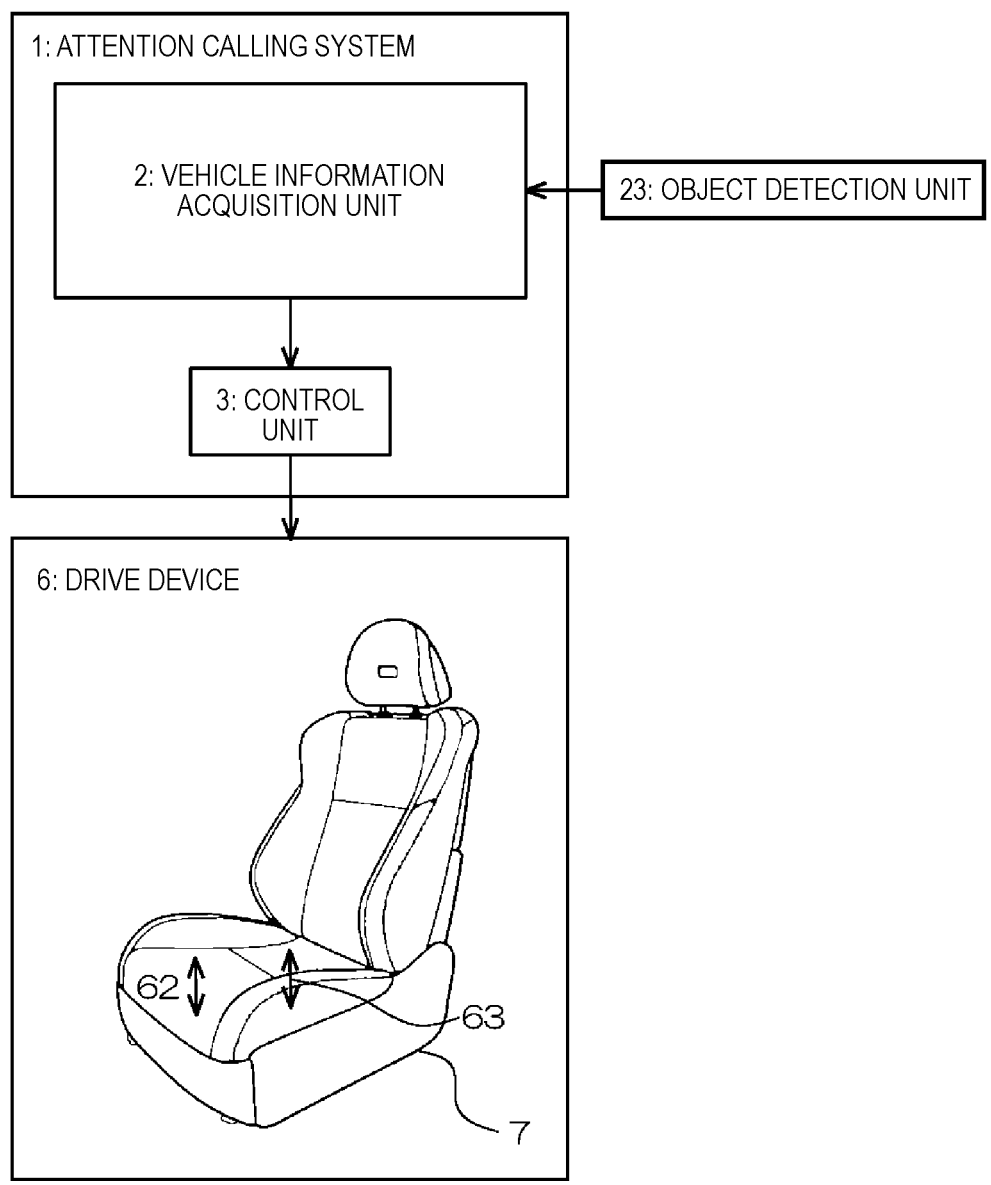
FIG. 6 is a block diagram for illustrating an operation of the attention calling system, which is performed when object detection information is received.

FIG. 6 depicts that the object detection unit 23 is connected to the attention calling system 1. The object detection unit 23 is configured to recognize objects around the own vehicle, such as other vehicles, pedestrians, obstacles and the like, and to call attention to the driver by using an image, a sound, a light and the like. The object detection information output from the object detection unit 23 is received by the vehicle information acquisition unit 2. Thereby, for example, when an object around the vehicle is detected, i.e., when the control unit 3 determines that seated person's attention should be called, the control unit outputs the drive signals to the motor 62 for front vertical and the motor 63 for rear vertical. Thereby, the seat surface of the vehicle seat 7 is vibrated in the upper-lower direction, so that it is possible to call seated person's attention.

Figure 7:
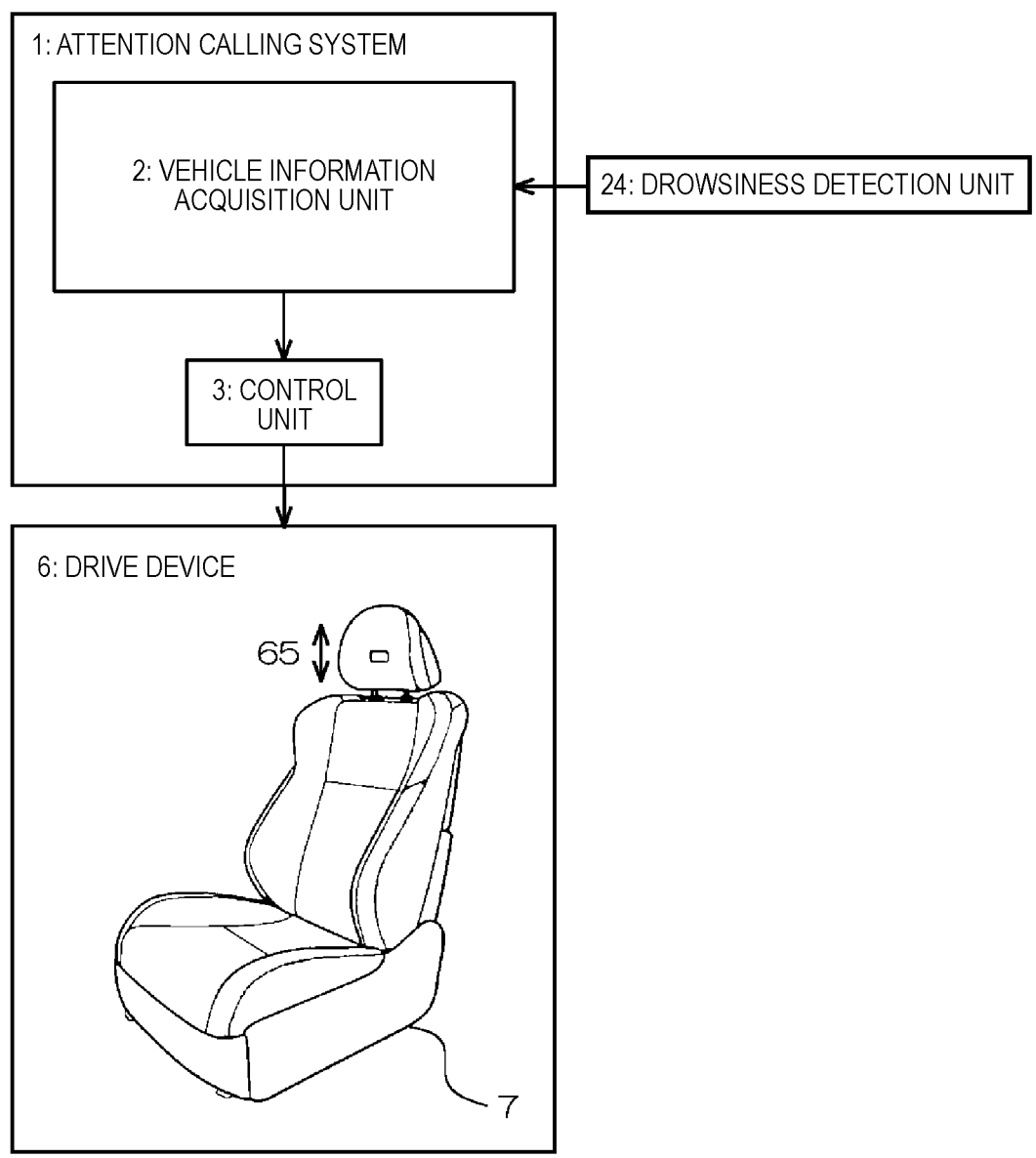
FIG. 7 is a block diagram for illustrating an operation of the attention calling system, which is performed when drowsiness detection information is received.

FIG. 7 depicts that the drowsiness detection unit 24 is connected to the attention calling system 1. The drowsiness detection unit 24 is configured to detect drowsiness of the seated person by a camera configured to capture a line of sight of the seated person or the like and to call attention to the driver by a sound, a voice and the like. The drowsiness detection information output from the drowsiness detection unit 24 is received by the vehicle information acquisition unit 2. Based on the received information, the control unit 3 outputs the drive signal to the motor 65 for headrest. Thereby, the headrest of the vehicle seat 7 is vibrated, so that it is possible to call seated person's attention.

In addition to the examples shown in FIGS. 4 to 7, the attention calling system 1 can also be configured to acquire information, which is to be generated by a variety of systems/devices provided for a vehicle, as the vehicle information. Also, the attention calling system can be configured to acquire information, which is to be obtained by a variety of sensors provided for a vehicle, as the vehicle information. Based on the predetermined condition, the control unit 3 determines whether the acquired vehicle information indicates an attention state in which the seated person's attention should be called. When it is determined that it is the attention state, the control unit controls the drive devices 6. An operation condition as to which drive device 6 is to be controlled in association with each of the vehicle information (for example, the collision beforehand detection, the lane deviation detection, the drowsiness detection and the like), i.e., the associations between the attention state indicated by each of the vehicle information and the drive devices 6 (61 to 69) are not limited to the examples shown in FIGS. 4 to 7 and can be set in advance. The associations are preferably made so that the seated person can intuitively understand each attention state. For example, regarding the attention calling associated with the oncoming vehicle in the front-rear direction, each part of the vehicle seat 7 may be vibrated in the front-rear direction. Also, in the case of the lane deviation, the driver's attention can be called by the vibration in the left-right direction.

As shown in FIG. 8, the attention calling system 1 may have the setting unit 4 configured to change the drive devices 6 to be controlled by the control unit 3 in correspondence to the contents of the vehicle information. The setting unit 4 is provided, so that the association between each attention state and the drive device 6 can be changed.

Figure 9:
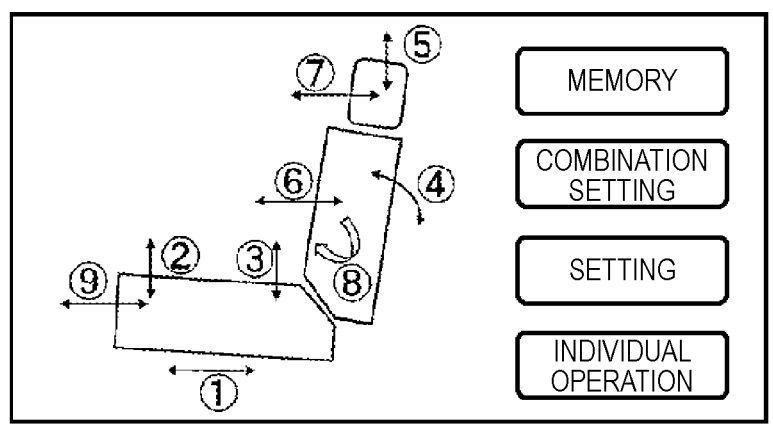
FIG. 9 is a pictorial view depicting a change example of the attention calling system having the setting unit.
Figure 10:
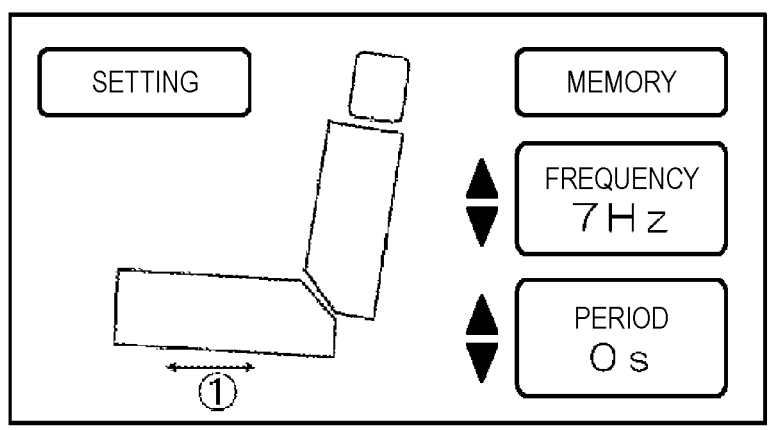
FIG. 10 is a pictorial view depicting another change example of the attention calling system having the setting unit.

In the illustrative example, the setting unit 4 has a display unit 41 and an input unit 42. As the units, a display having a touch panel or the like can be used. For example, as shown in FIG. 9, the drive device 6(8) currently set and the selectable drive devices 6 are displayed in correspondence to any vehicle information, so that it is possible to set any one by a user's touch operation. Thereby, the drive device 6 provided in the part selected in correspondence to a vehicle information is operated, so that the corresponding part is vibrated. Also, as shown in FIG. 10, with respect to a vibration generated at a part, it is possible to change parameters such as period, which are currently set, by a touch operation through the setting unit 4. In addition, the user can select or change an operation range, an operation condition and the like of the attention calling system 1 by the setting unit 4.

In the meantime, the disclosure is not limited to the above illustrative embodiments and can be changed or modified in diverse forms within the range defined in the claims of the disclosure.

The disclosure provides illustrative, non-limiting aspects as follows:

(1) According to a first aspect, there is provided an attention calling system for a vehicle seat having one or more drive devices incorporated therein, a position of the seat or a position of a predetermined part of the seat being capable of being adjusted by moving the seat or the predetermined part of the seat in both positive and negative directions at a predetermined speed by the drive device, the attention calling system including: a vehicle information acquisition unit that is configured to acquire vehicle information; and a control unit that is configured to determine based on the vehicle information whether it is an attention state in which seated person's attention should be called and controls at least one of the drive devices when it is determined that it is the attention state, wherein the control unit is configured to control the at least one drive device so that the seat or the predetermined part of the seat reciprocally moves in both positive and negative directions with reference to a current position at a speed higher than the predetermined speed, in correspondence to the attention state.

Accordingly, it is possible to move the seat or the predetermined part by using the one or more drive devices provided in an existing seat such as the electric seat and to apply vibrations to a body of the seated person, thereby intuitively calling seated person's attention. Also, it is not necessary to provide a special component or a drive device for the above calling attention, and it is possible to add an attention calling function to an electronic control unit for seat position adjustment, which is the same as the related art. Also, since the attention calling operation is performed at the higher speed than the usual position adjustment of the drive device, it is possible to make the seated person feel a sense of discomfort, thereby securely calling seated person's attention. Also, in a case where a plurality of drive devices is incorporated in each part of the seat, it is possible to drive an optimal seat part in accordance with the acquired vehicle information.

(2) According to a second aspect, there is provided the attention calling system according to the first aspect, wherein a drive signal that is applied to the drive device by the control unit has a magnitude and a period by which a vibration, which can be physically sensed by the seated person, is generated at the seat or the predetermined part of the seat.

Accordingly, it is possible to appropriately vibrate the seat or the predetermined part of the seat in conformity to a structure of the vehicle seat, thereby making the seated person securely feel a sense of discomfort.

(3) According to a third aspect, there is provided the attention calling system according to the first aspect, wherein the vehicle information comprises collision beforehand detection information, and wherein when the collision beforehand detection information is acquired, the control unit controls the at least one drive device so that at least the vehicle seat reciprocally moves in a front-rear direction.

Accordingly, when there is a possibility of collision, the control unit vibrates the seat in the front-rear direction, thereby applying strong stimulus to the seated person.

(4) According to a fourth aspect, there is provided the attention calling system according to the first aspect, wherein the control unit is configured to apply a drive signal to each of the at least one drive device so that a moving amount in the positive direction and a moving amount in the negative direction are the same with reference to the current position.

Accordingly, the control unit can control the current position or posture of the seat to not change during the reciprocal movement (vibration) or before and after the reciprocal movement.

(5) According to a fifth aspect, there is provided the attention calling system according to the first aspect, further including a setting unit configured to change the one or more drive devices to be controlled by the control unit in correspondence to a content of the vehicle information.

Accordingly, it is possible to change the vibration parts or the like in conformity to an intention of the seated person. Therefore, it is possible to perform an attention calling operation that can be easily understood by the seated person.

(6) According a sixth aspect, there is provided a vehicle seat controlling system including: a vehicle seat for a vehicle; a drive device incorporated inside the vehicle seat; and an electronic control unit configured to perform: controlling the drive device so that the seat or a predetermined part of the seat moves in both positive and negative directions at a predetermined speed, thereby adjusting a position of the seat or a position of the predetermined part of the seat in a case where the vehicle is in a usual state, acquiring vehicle information, determining whether the vehicle information indicates an attention state in which seated person's attention should be called, and controlling the drive device so that the seat or the predetermined part of the seat reciprocally moves in both positive and negative directions with reference to a current position at a speed higher than the predetermined speed, in response to determining that the vehicle information indicates in the attention state.

What is claimed is:

1. An attention calling system for a vehicle seat having one or more drive devices incorporated therein, the attention calling system comprising:
   an operating member, and
   a controller configured to:
      control, in a case where the vehicle is in a non-attention calling state and in response to an operation of the operating member by a seated person, the one or more drive devices so that the vehicle seat or a predetermined part of the vehicle seat moves in both positive and negative directions at a predetermined speed, thereby adjusting a position of the vehicle seat or a position of the predetermined part of the vehicle seat;
      acquire vehicle information;
      determine whether the vehicle information is indicating an attention state in which the seated person's attention should be called; and
      control the one or more drive devices so that the vehicle seat or the predetermined part of the vehicle seat reciprocally moves in both the positive and negative directions with reference to a current position at a speed higher than the predetermined speed, in correspondence to the attention state when it is determined by the controller that the vehicle information is indicating the attention state.

2. The attention calling system according to claim 1, wherein a drive signal that is applied to the one or more drive devices by the controller has a magnitude and a period by which a vibration, which can be physically sensed by the seated person, is generated at the vehicle seat or the predetermined part of the vehicle seat.

3. The attention calling system according to claim 1,
wherein the vehicle information comprises collision beforehand detection information, and
wherein when the collision beforehand detection information is acquired, the controller controls the one or more drive devices so that at least the vehicle seat reciprocally moves in a front-rear direction.

4. The attention calling system according to claim 1, wherein the controller is configured to apply a drive signal to each of the one or more drive devices so that a moving amount in the positive direction and a moving amount in the negative direction are the same with reference to the current position.

5. The attention calling system according to claim 1, further comprising a setting unit configured to change the one or more drive devices to be controlled by the controller in correspondence to a content of the vehicle information.

6. A vehicle seat controlling system comprising:
a vehicle seat for a vehicle;
a drive device incorporated inside the vehicle seat;
an operating member; and
an electronic control unit configured to perform:
controlling, in a case where the vehicle is in a non-attention calling state and in response to an operation of the operating member by a seated person, the drive device so that the vehicle seat or a predetermined part of the vehicle seat moves in both positive and negative directions at a predetermined speed, thereby adjusting a position of the vehicle seat or a position of the predetermined part of the vehicle seat,
acquiring vehicle information,
determining whether the vehicle information indicates an attention state in which the seated person's attention should be called, and
controlling the drive device so that the vehicle seat or the predetermined part of the vehicle seat reciprocally moves in both the positive and negative directions with reference to a current position at a speed higher than the predetermined speed, in response to determining that the vehicle information indicates in the attention state.

7. The attention calling system according to claim 1, wherein the predetermined speed is an adjustment speed at which the position of the vehicle seat or the position of the predetermined part of the vehicle seat is moved when being adjusted to change a seating position for the seated person.

* * * * *